United States Patent
Laudahn et al.

(10) Patent No.: US 11,267,745 B2
(45) Date of Patent: Mar. 8, 2022

(54) PROCESS FOR PRODUCING SYNTHETIC QUARTZ GLASS USING A CLEANING DEVICE

(71) Applicant: Heraeus Quarzglas GmbH & Co. KG, Hanau (DE)

(72) Inventors: Hilmar Laudahn, OT Thalheim (DE); Klaus-Uwe Badeke, Petersberg-Sennewitz (DE); Martin Trommer, Bitterfeld (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 680 days.

(21) Appl. No.: 15/536,426

(22) PCT Filed: Dec. 15, 2015

(86) PCT No.: PCT/EP2015/079732
§ 371 (c)(1),
(2) Date: Jun. 15, 2017

(87) PCT Pub. No.: WO2016/096811
PCT Pub. Date: Jun. 23, 2016

(65) Prior Publication Data
US 2017/0341967 A1 Nov. 30, 2017

(30) Foreign Application Priority Data
Dec. 16, 2014 (EP) .................... 14198100

(51) Int. Cl.
*C03B 19/14* (2006.01)
*C03B 20/00* (2006.01)
(Continued)

(52) U.S. Cl.
CPC ......... *C03B 19/1415* (2013.01); *B01J 20/103* (2013.01); *C03B 20/00* (2013.01);
(Continued)

(58) Field of Classification Search
CPC .......... B01D 63/00–16; B01D 2255/30; B01D 2253/106; C03B 19/1415–1438
See application file for complete search history.

(56) References Cited

U.S. PATENT DOCUMENTS 4,104,112 A * 8/1978 Stutz ................. B01D 1/16
159/4.01
4,212,663 A * 7/1980 Aslami ............. C03B 37/01413
118/724

(Continued)

FOREIGN PATENT DOCUMENTS

DE 3016010 A1 10/1981
DE 102013209673 B3 5/2014

(Continued)

OTHER PUBLICATIONS

Sigma-Aldrich silica comparison as provided by https://www.sigmaaldrich.com/catalog/ as viewed on Jan. 29, 2020 (Year: 2007).*

(Continued)

*Primary Examiner* — Jodi C Franklin
(74) *Attorney, Agent, or Firm* — Panitch Schwarze Belisario & Nadel LLP

(57) ABSTRACT

A method for the production of synthetic quartz glass using a special cleaning device is provided. The method includes (a) evaporating a production material containing a polymerizable polyalkylsiloxane compound while forming a production material vapor, (b) passing the production material vapor resulting from step (a) through a cleaning device to purify the production material vapor, (c) supplying the purified production material vapor resulting from step (b) to a reaction zone in which the purified production material vapor is converted to $SiO_2$ particles through oxidation and/or through hydrolysis, (d) depositing the $SiO_2$ particles resulting from step (c) on a deposition surface, and optionally drying and vitrifying the deposited $SiO_2$ particles resulting (Continued)

from step (d) to form synthetic quartz glass. The cleaning device includes a bulk of porous silica particles which have a BET specific surface area of at least 2 m²/g. A device for carrying out the method is also provided.

14 Claims, 1 Drawing Sheet

(51) Int. Cl.
*B01D 53/02* (2006.01)
*B01J 20/10* (2006.01)
*C03C 3/04* (2006.01)

(52) U.S. Cl.
CPC ............... *C03C 3/04* (2013.01); *B01D 53/02* (2013.01); *B01D 2253/106* (2013.01); *B01D 2253/304* (2013.01); *B01D 2253/306* (2013.01); *C03B 2201/02* (2013.01); *C03B 2207/32* (2013.01); *C03B 2207/81* (2013.01); *C03B 2207/85* (2013.01)

(56) References Cited

U.S. PATENT DOCUMENTS

| | | | | |
|---|---|---|---|---|
| 4,317,668 | A * | 3/1982 | Susa | C03B 37/016 65/17.2 |
| 4,680,045 | A * | 7/1987 | Osafune | C03B 19/12 501/12 |
| 4,680,048 | A * | 7/1987 | Motoki | C03B 19/12 501/12 |
| 4,872,895 | A * | 10/1989 | Fleming | C03B 19/12 65/395 |
| 4,888,036 | A * | 12/1989 | Clasen | C03B 19/12 65/17.2 |
| 5,236,483 | A * | 8/1993 | Miyashita | C03B 19/12 264/621 |
| 5,558,689 | A * | 9/1996 | Yanagihara | B01D 46/0001 55/492 |
| 5,703,191 | A * | 12/1997 | Henderson | C03B 19/1415 528/31 |
| 5,707,415 | A * | 1/1998 | Cain | B01D 3/346 65/379 |
| 5,900,532 | A * | 5/1999 | Ikeda | G01N 1/405 73/23.41 |
| 6,080,281 | A * | 6/2000 | Attia | B01J 20/041 204/157.3 |
| 6,133,178 | A * | 10/2000 | Yamada | C03B 19/06 501/54 |
| 6,180,077 | B1 * | 1/2001 | Dobrat | C03C 1/022 423/240 S |
| 6,312,656 | B1 * | 11/2001 | Blackwell | B01J 19/26 423/337 |
| 6,418,756 | B1 * | 7/2002 | McDermott | C03B 19/1415 65/377 |
| 6,590,116 | B1 * | 7/2003 | Flynn | B01D 15/00 556/460 |
| 6,832,493 | B2 * | 12/2004 | Bowden | C03B 19/06 264/86 |
| 7,572,423 | B2 * | 8/2009 | Kutsovsky | C01B 13/20 423/337 |
| 8,038,971 | B2 * | 10/2011 | Davis | C01B 33/183 423/337 |
| 8,574,961 | B2 * | 11/2013 | Knapp | H01L 23/3107 438/112 |
| 9,481,597 | B2 * | 11/2016 | Badeke | C03B 19/1415 |
| 2002/0152771 | A1 * | 10/2002 | Bhandarkar | C03C 3/06 65/395 |
| 2003/0121283 | A1 * | 7/2003 | Yu | C03B 19/06 65/17.2 |
| 2004/0151990 | A1 * | 8/2004 | Ganguli | G03F 1/64 430/5 |
| 2004/0172979 | A1 * | 9/2004 | Bhandarkar | C03B 19/12 65/395 |
| 2005/0032622 | A1 * | 2/2005 | Dawes | C03B 19/02 501/54 |
| 2007/0084346 | A1 * | 4/2007 | Boyle | B82Y 15/00 96/101 |
| 2007/0151450 | A1 * | 7/2007 | Giacobbe | B01J 20/10 95/128 |
| 2008/0264106 | A1 * | 10/2008 | Oswald | C03B 19/12 65/395 |
| 2009/0205370 | A1 * | 8/2009 | Costa | C03C 1/006 65/17.2 |
| 2009/0252947 | A1 * | 10/2009 | Rosch | C03B 19/1453 428/305.5 |
| 2013/0075324 | A1 * | 3/2013 | Sakamoto | B01D 71/36 210/500.23 |
| 2013/0175468 | A1 * | 7/2013 | Uehara | B09C 1/002 252/175 |
| 2013/0295362 | A1 * | 11/2013 | Kanatzidis | B01J 20/28057 428/219 |
| 2014/0178567 | A1 * | 6/2014 | Lyons | C23C 14/12 427/8 |
| 2014/0246356 | A1 * | 9/2014 | Guo | B01D 61/147 208/187 |
| 2014/0367338 | A1 * | 12/2014 | Gu | B01D 15/265 210/656 |
| 2014/0370577 | A1 * | 12/2014 | Jenkins | B01D 53/52 435/266 |
| 2015/0118137 | A1 * | 4/2015 | Hoang | B01J 20/20 423/245.1 |
| 2015/0166353 | A1 * | 6/2015 | Kobayashi | B01J 20/28004 502/407 |
| 2015/0209717 | A1 * | 7/2015 | Ballantyne | B01D 53/04 95/116 |
| 2015/0258487 | A1 * | 9/2015 | Hornbostel | B01J 20/328 206/0.7 |
| 2016/0229959 | A1 * | 8/2016 | Li | B01J 20/06 |
| 2016/0264447 | A1 * | 9/2016 | Ochs | C03C 4/0085 |
| 2016/0279597 | A1 * | 9/2016 | Shigeta | B01J 20/10 |
| 2018/0065879 | A1 * | 3/2018 | Otto | C03B 19/1415 |
| 2018/0282196 | A1 * | 10/2018 | Lehmann | C03B 19/14 |
| 2019/0002325 | A1 * | 1/2019 | Czermak | C03C 1/006 |
| 2019/0077688 | A1 * | 3/2019 | Otter | C03C 3/06 |
| 2020/0038796 | A1 * | 2/2020 | Fekety | B01D 47/06 |

FOREIGN PATENT DOCUMENTS

| | | |
|---|---|---|
| EP | 0529189 A2 | 3/1993 |
| EP | 0760373 A1 | 3/1997 |
| EP | 0765845 A1 | 4/1997 |
| GB | 1559978 A | 1/1980 |
| WO | 9847946 A1 | 10/1998 |
| WO | 9915468 A1 | 4/1999 |
| WO | 9954259 A1 | 10/1999 |
| WO | 2013087751 A1 | 6/2013 |
| WO | 2013092553 A1 | 6/2013 |
| WO | 2014187513 A1 | 11/2014 |

OTHER PUBLICATIONS

Product 60740 SDS as provided by https://www.sigmaaldrich.com (Year: 2007).*
De Jong reference, Comparison of three methods of measuring surface area of soils (provided by Applicant on May 4, 2020) (Year: 1999).*
Wikipedia entry for "specific surface area" (Year: 2021).*
Int'l Preliminary Report on Patentability dated Jun. 29, 2017 in Int'l Application No. PCT/EP2015/079732.
Int'l Search Report dated Feb. 16, 2016 in Int'l Application No. PCT/EP2015/079732.

* cited by examiner

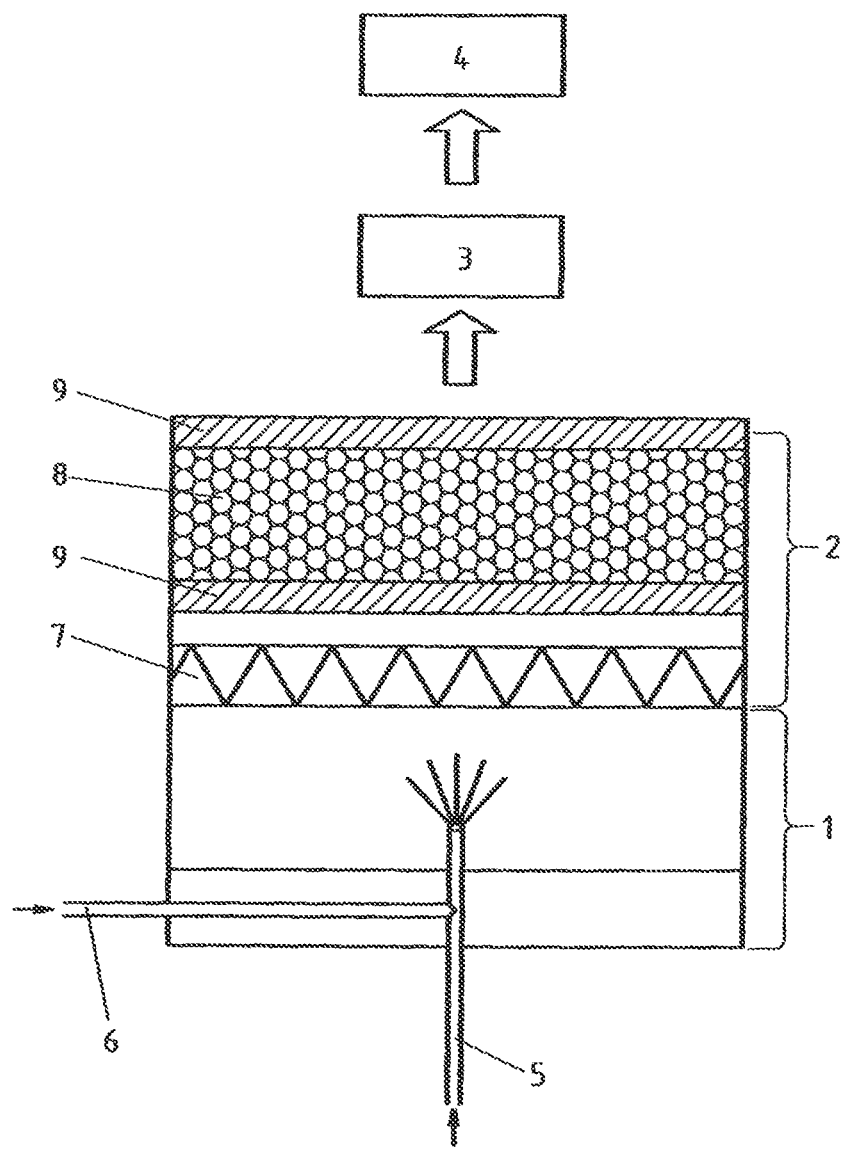

PROCESS FOR PRODUCING SYNTHETIC QUARTZ GLASS USING A CLEANING DEVICE

CROSS-REFERENCE TO RELATED APPLICATIONS

This application is a Section 371 of International Application No. PCT/EP2015/079732, filed Dec. 15, 2015, which was published in the German language on Jun. 23, 2016, under International Publication No. WO 2016/096811 A1 and the disclosure of which is incorporated herein by reference.

BACKGROUND OF THE INVENTION

The present invention relates to a method for producing synthetic quartz glass using a special cleaning device, a device for producing synthetic quartz glass comprising a special cleaning device, the use of a bulk of porous silica particles for cleaning a production material vapor for producing synthetic quartz glass, as well as the synthetic quartz glass, which is obtained by the process according to the present invention.

For producing synthetic quartz glass, $SiO_2$-particles are produced from a silicon-containing starting substance in a CVD-procedure by means of hydrolysis or oxidation and deposit on a moving support. The method can be subdivided into external and internal deposition methods. In the case of an external deposition method, the $SiO_2$-particles are applied onto the outside of a rotating support. Examples of pertinent external deposition methods include the so-called OVD method (Outside Vapor Phase Deposition), the VAD method (Vapor Phase Axial Deposition) or the PECVD method (Plasma Enhanced Chemical Vapor Deposition). The best-known example of an internal deposition method is the MCVD method (Modified Chemical Vapor Deposition), in which $SiO_2$-particles are deposited on the inner wall of a tube heated from outside.

If the temperature in the area of the support surface is sufficiently high, the $SiO_2$-particles vitrify directly, which is also known as "direct vitrification". In contrast, the temperature during the deposition of the $SiO_2$-particles in the so-called "soot method" is so low that a porous $SiO_2$-soot layer is obtained, which is then sintered into transparent quartz glass in a separate process step. Both, the direct vitrification and the soot method lead to a dense, transparent, high pure, synthetic quartz glass.

Silicon tetrachloride ($SiCl_4$) is known from the prior art as a silicon-containing production material for the production of synthetic quartz glass. Silicon tetrachloride and other analogous chlorine-containing substances already possess sufficient vapor pressures at moderate temperatures below 100° C., such that any impurities usually remain in the liquid phase and the production of ultrapure soot bodies is made easier.

However, it is known that, during the evaporation of the silicon tetrachloride, partially liquid drops are entrained within the inert vapor stream used and are not completely evaporated until the reaction zone has been reached. Thus, the impurities contained in the liquid phase finally reach the soot-body and thus deteriorate the quality of the quartz glass produced thereof. The impurities are usually metals.

Some processes to complete the evaporation of the silicon tetrachloride within the evaporation zone, so that the impurities mentioned above do not reach the reaction zone, are known in the prior art. For example, GB 1 559 978 describes that the installation of glass wool in the evaporator prevents the droplets formed during the evaporation from escaping into the production material vapour stream, since these are retained by the glass wool. A similar approach is described in U.S. Pat. No. 4,212,663, wherein the high surface area of the non-porous filter layer is simultaneously used to evaporate the liquid droplets. EP 0 765 845 A1 describes the use of a filter which comprises activated carbon for the purification of the production material vapor stream. In this case, in contrast to the aforementioned methods, the steam and not (also) the liquid are contacted with the filter.

Common to all these methods is that the solution to the problem is to retain the undamped and entrained liquid drops in the respective layers, since undamped liquid drops in the steam line can lead to malfunctions on the burner having, as a consequence, the generation of defects in the quartz glass and impairment of the combustion efficiency and long-term stability of the deposition process.

However, a major disadvantage of the chlorine-containing production materials, such as silicon tetrachloride, is the production of hydrochloric acid when converted into synthetic quartz glass, which causes high costs for exhaust gas scrubbing and disposal. Therefore, in principal, when $SiCl_4$ is used, devices which prevent the entry of moisture are used. This reduces the formation of hydrochloric acid and avoids the formation of silica acid. This procedure is familiar to a person skilled in the art.

In the past, in order to circumvent these requirements, a large number of so-called crystal-free organosilicon compounds have been tested as production materials for quartz glass production. Examples include monosilanes, alkoxysilanes, siloxanes and silazanes. A particularly interesting group of these so-called chlorless organosilicon compounds are polyalkylsiloxanes (also called briefly as "siloxanes"), which are known, for example, from DE 30 16 010 A1. In particular, cyclic polyalkylsiloxanes, which can be subsumed under polyalkylsiloxanes, are distinguished by a particularly high proportion of silicon per weight proportion, which contributes to the economic efficiency of their use in the production of synthetic quartz glass. Due to the industrial availability in high purity, octamethylcyclotetrasiloxane (OMCTS) is used in particular.

Such polyalkylsiloxane compounds are polymerizable and present in the production material in pure form or as a mixture with other components typically in liquid form. These compounds can also contain traces of polymerizable silanols. They can be fed to the consuming unit, such as a deposition burner, in the liquid form and sprayed at the burner outlet or in the flame. Usually, however, the production material is converted into a gaseous or vapor phase by means of an evaporator and fed to the consuming unit as a continuous gas stream via a line system.

Several methods for the production of synthetic quartz glass, based on these so-called chlorine-free production materials, are described in the prior art. For example, reference is made to EP 0 760 373 A, WO 99/15468 A, WO 99/54259 A, WO 2013/092553 A and EP 0 529 189 A.

However, the use of polyalkylsiloxanes involves other difficulties with regard to possible influences of impurities of the production material on the quality of the resulting quartz glass, in a fundamental difference from the methods described above, in which the low molecular metallic impurities in the silicon tetrachloride reduce the quality of the resulting quartz glass and at the same time the entry of moisture is avoided. In principle, $SiCl_4$ is thermally more stable than cyclic polyalklysiloxanes and their boiling point is much lower. On the other hand, cyclic polyalkylsiloxanes practically do not react with moisture at room temperature. However, one of the main problems associated with the use of cyclic polyalkylsiloxanes is in that polymerizations and gel formation take place. As already stated above, it is known that polyalkylsiloxanes may contain traces of polar impurities such as water, silanols and sometimes even polymerization-catalytically acting trace components (e.g. Lewis acids or Lewis bases). In the case of silanols, these impurities can either react with themselves to form polymers or initiate ring-opening reactions with the starting compound. This ultimately leads to the formation of the above-mentioned polymer siloxane residues and gels. These polymers and gels usually remain in the evaporator, in the steam lines, control valves, throttles, other gas metering devices and lines and are concentrated therein. This can lead to a massive impairment of the control behavior of the material streams. Reproducible process management is thus made difficult. In extreme cases, this leads to clogging. Both effects increase the downtime for maintenance and cleaning steps, whereby a process using polyalkylsiloxanes entails pertinent costs.

On the other hand, these residues also have a negative effect on the properties of the resulting quartz glass, since the equal distribution of the mass flows of the production material vapor stream is uncontrollable and thus not reproducibly affected. This increases the radial and axial density variation in the soot, the variation in the chlorine content in the subsequent dehydration or chlorination step. Furthermore, such residues lead to an increase in the outside diameter variation in a multi-burner method. This, in turn, has an impact on the rejects associated with corresponding material loss. This results in poorer process efficiency combined with increased production costs. In addition, the production material is generally subject to certain batch variations, which are in the ppm range, but nevertheless contribute to the above-described lack of controllability and reproducibility of the process. Raw materials from different manufacturers also have different impurities/contamination levels so that the control over the quality of the resulting quartz glass is not ensured.

To solve these problems, U.S. Pat. No. 5,558,687 proposes to spray the polyalkylsiloxane component initially and to apply it partially in liquid form to a packing material. The liquid polyalkylsiloxane drops are carried down with a carrier gas stream through the packing material, evaporating within this packing material. The direction of the vapor stream leaving the package is subsequently changed by 180° (flowing from bottom to top), so that the higher molecular impurities (polymers and gels) settle at the bottom of the device and the vapor stream, purified in this way, flows for further use upwards. It is also described here that an additional optional filter made of glass wool can be installed in this vapor stream. However, strong adhesions by gel formation occur on the inlet side of the packing material due to the presence of the liquid phases. Furthermore, the relatively long response times of such an evaporator are disadvantageous, since the time to vaporize the liquid material in the package is long. It should also be noted that only the use of a glass wool filter is mentioned in relation to the installation of a filter into the vapor phase. From a technological point of view, this is initially caused by the fact that such a filter is known to have little influence on the pressure drop of the system above the filter. Glass wool is not porous and generally has an internal surface area, of about 1 to <2 m²/g, measured according to the BET-method.

Another approach for avoiding polymer and gel formation is described in WO 98/47946 A1. This document discloses that polar impurities in polyalkylsiloxane, which basically have boiling points near the boiling points of the target polyalkylsiloxane, contribute to polymer and gel formation within the polyalkylsiloxane. However, it is described herein that surprisingly these polar impurities do not evaporate and that their removal by solid phase extraction by means of a porous silica gel package from the liquid polyalkylsiloxane production material, leads to the fact that, the use of production material purified by this way (i.e., polyalkylsiloxane without non-volatile impurities) is advantageous in the quartz glass production since this is no longer tending to polymerisation and/or gel formation. However, it is disadvantageous that this strategy requires an additional process step, which is associated with corresponding time and costs. Especially by the usage of large quantities of siloxanes (>50 to), this liquid/solid extraction as an additional cleaning step is elaborate and expensive. Furthermore, the cleaning effect during the extraction process decreases with increasing loading of the silica material (see WO 98/47946 A1, FIGS. 4A-D). As a result, the quality of the raw material can change with increasing extraction time. Furthermore, such a process is associated with relatively long residence times or contact times with the silica material. Depending on the pretreatment of the silica materials, they can act as a weak L-base. In the case of prolonged contact time, as in case of liquid extraction, acid components can be introduced as a function of the silica material, or rearrangement reactions can take place in the trace regions, which adversely affect the polymerization behavior in the subsequent evaporation (i.e., ring opening reactions can be initiated and rearrangement reactions unto higher cyclical homologues can also be initiated). A further problem is that, due to the intense liquid/solid contact, elementary trace impurities can be introduced, which in turn can adversely affect the polymerization behavior of the production compound.

BRIEF SUMMARY OF THE INVENTION

Starting from this prior art, the present invention is based on an objective of providing a process for the production of synthetic quartz glass using a polyalkylsiloxane production material which overcomes at least one, preferably all the disadvantages of the prior art. In particular, the present invention is based on the object of providing a process for producing synthetic quartz glass using a polyalkylsiloxane production material in which a space-saving apparatus can be used. The need for an additional cleaning step should preferably be avoided. In this case, however, a production material vapor is to be provided for the production of quartz glass, which has as low a tendency for polymerization and/or gel formation such as the production material vapors of the prior art, preferably a lower tendency for polymerization and/or gel formation as the production material vapors of the prior art. Thus, the controllability and reproducibility of the method for the production of quartz glass should be improved.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a schematic representation of the device according to an embodiment of the present invention, whereby the device comprises an optional fabric and the production material stream (liquid/gaseous) takes place from the bottom upwards.

DETAILED DESCRIPTION OF THE INVENTION

The aforementioned objectives were achieved by the method according to the present invention described below for the production of synthetic quartz glass, the device according to the present invention for the production of synthetic quartz glass, the use of a bulk of porous silica particles according to the present invention, and the synthetic quartz glass according to the present invention.

According to an embodiment of the present invention, a method for producing synthetic quartz glass is provided comprising the following steps of:
 (a) evaporating a production material that contains at least one polymerizable polyalkylsiloxane compound while forming a production material vapor;
 (b) passing the production material vapor resulting from process step (a) through at least one cleaning device to clean the production material vapor;
 (c) supplying the purified production material vapor resulting from process step (b) to a reaction zone, in which the production material vapor is converted to $SiO_2$ (d) particles through oxidation and/or through hydrolysis;
 (d) depositing the $SiO_2$ particles resulting from process step (c) on a deposition surface; and
 (e) optionally, drying and vitrifying the $SiO_2$ particles resulting from process step (d) to form synthetic quartz glass.

The method according to the present invention is then characterized in that the at least one cleaning device of the process step (b) comprises a bulk of porous silica particles which have a specific surface area of at least 2 $m^2/g$, whereby the specific surface is being determined by a measurement according to Brunauer, Emmett and Teller (BET-surface).

Surprisingly, it has been found that the tendency of the production material vapor to polymerize and/or to form gels is reduced by using a bulk of porous silica particles, which has a specific surface area of at least 2 $m^2/g$, in the already evaporated production material vapor. This is particularly surprising, in that on the one hand it is described in the prior art that the impurities causing the polymerization are not volatile and must therefore be separated from the liquid phase. On the other hand, this is surprising since the oligomeric and/or polymeric components which have been formed during evaporation can be separated by the use of a porous bulk to that extent so that the bulk is not subjected to clogging by polymer deposits and/or gel formation. This leads, surprisingly, to the fact that in total the pressure drop over the bulk remains low, in particular technologically and economically reasonable, and that an expensive, upstream liquid/solid extraction process in the liquid phase can be avoided.

In a preferred embodiment, the BET-surface area of the bulk of porous silica particles is at least 2 $m^2/g$, more preferably at least 3 $m^2/g$, more preferably at least 4 $m^2/g$, whereby the specific surface is being determined by a measurement according to Brunauer, Emmett and Teller (BET-surface area).

In a further preferred embodiment, the BET-surface area of the bulk of porous silica particles is at most 450 $m^2/g$, more preferably at most 300 $m^2/g$, even more preferably at most 250 $m^2/g$, even more preferably at most 200 $m^2/g$, even more preferably at least 150 $m^2/g$, even more preferably at most 100 $m^2/g$, whereby the specific surface area is being determined by a measurement according to Brunauer, Emmett and Teller (BET-surface area).

In a further preferred embodiment, the BET-surface area of the bulk of porous silica particles is 2 to 450 $m^2/g$, more preferably 2 to 300 $m^2/g$, even more preferably 2 to 250 $m^2/g$, even more preferably 2 to 200 $m^2/g$, even more preferably 3 to 150 $m^2/g$, even more preferably 4 to 100 $m^2/g$, whereby the specific surface area is being determined by a measurement according to Brunauer, Emmett and Teller (BET-surface area).

When the BET-surface area of the porous silica particles is adjusted in the above-mentioned ranges, the method according to the present invention can achieve a high process stability with a reduced maintenance cost. The examples according to the present invention show that sufficient process stability cannot be achieved with porous silica particles having a too small BET-surface area of less than 2 $m^2/g$ and a too high BET-surface area of more than 450 $m^2/g$.

Without wishing to be bound by a certain theory, it is suspected that various types of trace impurities are contained in the production material which may cause residues in the evaporator and in the steam line.

A) High-Boiling Trace Impurities

These are characterized by the fact that they can be much more difficult to evaporate and can remain in the evaporator and in the evaporator lines due to their very low vapor pressure or low dew point, and can be linked to gel-like residues in the evaporating system in case of long dwell time.

B) Polar Trace Impurities

Such reactive trace impurities can, for example, be the abovementioned silanols. These trace impurities can initiate the ring-opening reactions of cyclic siloxanes due to their polar OH-groups. They can react to higher boiling impurities via a condensation reaction with the main cyclic components, which then also accumulate as gel-like impurities in the steam line.

C) Catalytically Active Trace Impurities

Reactive catalytically active trace impurities are, for example, Lewis acids and Lewis bases. These compounds can initiate ring-opening reactions in the presence of traces of residual moisture. These can also be, for example, metallic trace impurities (metal oxides and/or metal halides), which also participate in the ring-opening reactions of the cyclic siloxanes. A further reaction with the main cyclic components may result in higher-boiling impurities which then also accumulate as gel-like impurities in the steam line.

The reactive trace impurities under B) and C) (for example, silanols, Lewis acids and Lewis bases) can, surprisingly and according to the present invention, be removed from the raw material particularly effective and efficiently when the production material is passed through a cleaning device in the form of a production material vapor, which comprises a bulk of porous silica particles having a specific surface area of at least 2 $m^2/g$.

Since no significant residues of silanols have been found in the porous silica particles of the cleaning apparatus after the implementation of the procedure, it is assumed that at the temperatures used, the reactive silanols on the silica have predominantly converted into cyclic, volatile siloxanes. As a result, the service life of such a package can be significantly increased according to the present invention.

In addition, it has been found that via the use of the bulk according to the present invention, the differences in the batches in the production compounds can be compensated, so that the synthetic quartz glass produced has overall a consistently good quality. Together with the fact that a uniform distribution of the mass flows can be achieved as a result of the reduction and/or avoidance of polymer and/or gel deposition in the evaporator, in the steam lines, control valves, throttles, other gas metering devices and lines, the method can be carried out in a controlled and reproducible manner due to the subject matter of the present invention. As described above, this leads to a significant cost saving.

Process Step (a)—Evaporation of the Production Material

In the process step (a), a production material which contains at least one polymerizable polyalkylsiloxane compound is evaporated to form a production material vapor.

In principle, any polymerizable polyalkylsiloxane compound which is suitable for the production of synthetic quartz glass can be used according to the present invention. Within the scope of the present invention, the term polyalkylsiloxane comprises both linear (including also branched structures) as well as cyclic molecular structures.

Particularly well-suited cyclic representatives are polyalkylsiloxanes having the following general sum formula $$Si_pO_p(R)_{2p},$$

whereby, p is an integer greater than or equal to 2. The radical "R" is an alkyl group, in the simplest case a methyl group.

Polyalkylsiloxanes are characterized by having a particularly high fraction of silicon per weight fraction, which contributes to the economic efficiency of their use in the production of synthetic quartz glass.

In this context, the polyalkylsiloxane compound is preferably selected from the group consisting of hexamethylcyclotrisiloxan (D3), octamethylcyclotetrasiloxan (D4), decamethylcyclopentasiloxan (D5), dodecamethylcyclohexasiloxan (D6), tetradecamethylcycloheptasiloxan (D7), hexadecamethylcyclooctasiloxan (D8), and their linear homologues and any mixtures of the above-mentioned compounds. The notation D3, D4, D6, D7 and D8 is derived from a notation introduced by General Electric Inc., in which "D" represents the group [(CH$_3$)$_2$Si]—O—.

Mixtures of the above-mentioned polyalkylsiloxane compounds can be used just as well in the scope of the present invention.

Due to the availability of commercial quantities at high purity, octamethylcyclotetrasiloxane (OMCTS) is preferably currently used. It is therefore particularly preferred, in the scope of the present invention, if the polyalkylsiloxane compound is octamethylcyclotetrasiloxane (D4).

In general, it is possible for the production material to be subjected to a purification step before the introduction into process step (a). Those skilled in the art are aware of such purification methods. In a preferred embodiment, however, the production material is not previously subjected to an upstream purification process. This means that the production material is preferably not subjected to a process in which any impurity is removed from the commercially available product. Preferably, no impurities A) to C), as described above, are removed. More particularly preferred, according to the present invention, is the process characterized in that the liquid production material of the at least one polymerizable polyalkylsiloxane compound is not subjected to solid phase extraction prior to evaporation. Thus, the production material is preferably not subjected to liquid/solid phase extraction. Surprisingly, it has been found that quartz glass with high controllability and reproducibility can nevertheless be produced by the method according to the present invention. Particularly in that an additional cleaning step can be omitted, the method according to the present invention can achieve costs by saving time and reducing the downtimes.

Moreover, if the production material is not subjected to liquid/solid phase extraction in particular, it is possible to avoid additional contamination from the solid phase into the production material, as explained above.

Evaporation of the production material can be carried out with or without the presence of a carrier gas component. Preferably, the evaporation of the production material is carried out in the presence of a carrier gas, since this allows evaporation to take place at temperatures below the boiling point of the polyalkylsiloxane compound. This means that preferably, the production material vapor additionally comprises a carrier gas. Such a procedure is preferred if the evaporation of the production material should take place below its boiling point. The inert gas is preferably chemically inert and is preferably nitrogen or argon. The molar ratio of the polymerizable polyalkylsiloxane compound to the carrier gas is preferably in the range from 0.01 to 2; particularly preferred in the range from 0.02 to 1.5 and more particularly preferred in the range from 0.05 to 1.25. In particular, the carrier gas used is preferably nitrogen with a moisture content of <40 ppm by volume, and OMCTS as the polymerizable polyalkylsiloxane compound. In this case, it is also preferred that the molecular ratio of OMCTS to nitrogen is in the range from 0.015 to 1.5.

The process step of the evaporation is known per se to a person skilled in the art. The polyalkylsiloxane compound is converted into a vapor phase at temperatures between 120 and 200° C., depending on the selected molecular ratio of the polyalkysiloxane compound and carrier gas. The evaporation temperature in the evaporation chamber should always be at least a few degrees above the dew point of the polyalkylsiloxane compound. The dew point is again dependent on the selected molecular ratio of polyalkylsiloxane compound and carrier gas. In a preferred embodiment, the polyalkylsiloxane compound is preheated to temperatures between 40 and 120° C. before evaporation and then sprayed into an evaporation chamber which has a higher temperature than the pre-heating of the production materials. In a preferred embodiment, the inert carrier gas can additionally be preheated to temperatures of up to 250° C. before it is fed to the evaporation chamber. It is advantageous that the temperature in the evaporation chamber is on average always above the dew point temperature of the mixture of polyalkylsiloxane and carrier gas. Suitable evaporation processes are described, for example, in International patent applications WO 2013/087751 A and WO 2014/187513 A, as well as in German patent application DE 10 2013 209 673.

Within the scope of the invention, the term "dew point" describes the temperature at which an equilibrium state of condensing and evaporating liquid is established.

When temperatures below the boiling point of the production material are used, the evaporation is preferably carried out together with an inert carrier gas.

Within the scope of the present invention, "evaporation" is understood to mean the process in which the production material is essentially converted from the liquid phase into a gas-phase. This is preferably done by using, as described above, temperatures above the dew point of the polymerizable polyalkylsiloxane compound as the main component of the production material. The person skilled in the art is aware that it technologically cannot be excluded that small liquid drops of the production material can be entrained. Thus, in process step (a), a production material vapor is preferably produced which preferably contains not less than 97 mol %, preferably not less than 98 mol %, more preferably not less than 99 mol %, particularly preferably not less than 99.9 mol % of gaseous components.

In particular, it is preferred that the temperature of the production material vapor, in particular for and/or during the subsequent process step (b), is maintained essentially above 100° C. As a result, the reactive trace components in the production material are sufficiently thermally "activated". This means in particular, that the trace components can have a high mobility due to the thermal activation so that they can be introduced into the inner pore structure of the bulk of the silica particles by the usual transport processes. This has in particular the advantage that the entire surface of these trace components (i.e. also the innermost pores of the silica particles) can be reached quickly in the vapor phase and thus an effective purification. The trace impurities can bind/absorb (chemisorption) or adsorb (physisorption) with the OH-groups of the surface and the pore-walls of the silica material (chemisorption). In this connection, it has been found that the bulk, by being essentially in contact with the production material in the gaseous phase, neither sticks or clogs, and in particular does not result in the formation of a filter cake and thus in an increased pressure loss across the bulk. Even after the evaporation of more than 15 tons of commercially available OMCTS no clogging could be observed.

The production material vapor generated by the process step (a) is fed subsequently to the process step (b).

Process Step (b)—Purification of the Production Material Vapor

In process step (b), the production material vapor resulting from process step (a) is conducted through at least one cleaning device in order to clean the production material vapor. The cleaning device of process step (b) comprises a bulk of porous silica particles which have a specific surface area of at least 2 m$^2$/g, whereby the specific surface is being measured by a measurement according to Brunauer, Emmett and Teller (BET-surface area).

Thus, according to the present invention, the production material vapor is brought into contact with a package of porous silica particles. It is indeed known to a person skilled in the art that the production material vapor may again pass into the liquid phase due to the pore condensation, but, according to the invention, the production material vapor, as described above, is first contacted with the package. This leads to the above-described efficiency of the purification of the production material and the surprising good practicability of the method according to the invention. While a good purification of the production material is obtained, whereby gel and polymer formation within the following devices can be avoided and which leads to a good controllability and reproducibility of quartz glass production, the package of silica particles is particularly durable and impaired only minimal especially by only a low pressure drop across the package, the entire process sequence of the quartz glass production. Thus, the change of the package is rarely required and leads to low downtimes. Moreover, the cleaning device is simple in terms of apparatus and can even be subsequently integrated into existing devices for quartz glass production.

According to the present invention, the specific surface area refers to the BET-surface unless otherwise stated. The method for determining this surface is known to the person skilled in the art. It can in particular be determined according to DIN ISO 9277: 2003-05.

It is particularly preferred if the BET-surface area of the porous silica particles is in the range from 2 to 450 m$^2$/g, more preferably 2 to 300 m$^2$/g, even more preferably in the range from 2 to 250 m$^2$/g, even more preferably in the range from 2 to 200 m$^2$/g, even more preferably in the range from 3 to 150 m$^2$/g, even more preferably in the range from 4 to 100 m$^2$/g. It has been found that, particularly in this area, the purification of the production material vapor is particularly effective and the service life is the longest.

In principle, silica particles which have the required specific surface area can be used for the bulk of silica particles. However, it is preferred that the silica particles comprise synthetic silica material.

The silica material preferably has contents of the elements of the group consisting of Li, Na, K, Ca and Mg, which in sum are less than 1 ppm, preferably less than 500 ppb, more preferably less than 250 ppb, most preferably less than 100 ppb and particularly preferably less than 50 ppb.

The silica material preferably has contents of the elements of the group consisting of Fe, Cu, Cr, Mn and Ni, which in sum are less than 1 ppm, preferably less than 500 ppb, more preferably less than 250 ppb, most preferably less than 100 ppb, and particularly preferably less than 50 ppb.

The silica material preferably has contents of the elements of the group consisting of Ti, Zr, and Zn, which in sum are less than 1 ppm, preferably less than 500 ppb, more preferably less than 250 ppb, most preferably less than 100 ppb, and particularly preferably less than 50 ppb.

The silicon material preferably has a content of Al which is less than 50 ppm, preferably less than 1 ppm, more preferably less than 500 ppb, most preferably less than 250 ppb, and particularly preferably less than 100 ppb.

The silica material preferably has a residual chlorine content which is less than 500 ppm, preferably less than 100 ppm, more preferably less than 50 ppm, most preferably less than 5 ppm, and particularly preferably less than 2 ppm.

Each of these preferred contents, preferably a combination of at least two of these contents, particularly preferably all contents, make the purification of the production material vapor particularly effective. Such silica particles are obtainable, for example, by a sludge granulation process (Eirich-granulation).

The process according to the present invention is preferably characterized in that the bulk of the porous silica particles has a grain size distribution in which at least 75% by weight of the particles have a diameter of 50 to 4000 μm. The fraction between 2000 and 4000 μm was determined by means of classical screening technology and the fraction between 1 and 2000 μm was determined by laser light scattering (using a Mastersizer 2000). The bulk of the porous silica particles has particularly preferably a particle size distribution in which at least 75% by weight of the particles have a diameter from 100 to 3000 μm, more preferably from 125 to 2500 μm and particularly preferably from 180 to 2000 μm. A further preferred grain size distribution according to the invention is present in which at least 75% by weight of the particles have a diameter of 500 to 2000 μm.

The weight percentages are based on the total weight of the bulk of porous silica particles. By means of this embodiment, particularly, a low pressure drop over the bulk can be achieved with a simultaneously efficient cleaning action. Contrary to the assessment of WO 98/47946, that smaller particle sizes of the silica are advantageous in the liquid/solid phase extraction, it has surprisingly been found that also in the particle size range preferred, according to the invention, an effective purification of the production material vapor takes place. At the same time, however, a higher flow rate can be realized and no additional process step is required.

The process according to the present invention is preferably characterized in that the bulk of the porous silica particles in all the described embodiments has a proportion of grain sizes <50 µm of at most 20% by weight, particularly preferably at most 15% by weight. The weight percentages are based on the total weight of the bulk of porous silica particles. By means of this embodiment, particularly, a low pressure drop over the bulk can be achieved with a simultaneously efficient cleaning action.

The process according to the present invention is also preferably characterized in that the bulk density of the bulk of the porous silica particles is from 0.5 to 3 g/cm$^3$, more preferably from 0.75 to 2 g/cm$^3$, and particularly preferably from 0.9 to 1.5 g/cm$^3$. The determination of the bulk density is known to a person skilled in the art and can in particular be carried out in accordance with DIN 53 194. This bulk density represents in particular a good combination between a low pressure drop over the bulk and thus a high throughput and an efficient and effective purification.

The process according to the present invention is preferably characterized in that the pressure drop of the production material vapor by the purification in process step (b) is 2 to 750 mbar, preferably 3 to 400 mbar, more preferably 5 to 100 mbar.

According to the present invention, the inflow velocity of the production material vapor from process step (a) into the process step (b) is preferably 0.01 to 2 m/s, more preferably 0.02 to 1 m/s. A good cleaning performance can still be achieved at these speeds, despite the high throughput. In this case, it is particularly preferred that the average dwell time of the production material vapor in the bulk of silica particles is less than 2 min, particularly preferably less than 1 min, particularly preferably less than 45 s, more preferably less than 30 s, more preferably less than 15 s, and most preferably less than 5 s. This short average dwell time results, in particular, in that secondary reactions between the silica material and the production material vapor are not initiated (e.g. ring-opening reactions). Such a short average dwell time can be realized, in particular, since the production material is in the form of a steam.

The production material vapor should have a temperature of more than 100° C., preferably more than 120° C., and particularly preferably more than 130° C., in process step (b). This ensures that the production material remains essentially in the steam form. If necessary, additional heating devices can be provided for this purpose in order to ensure this temperature of the production material vapor.

Preferably, the bulk height of the bulk of the porous silica particles is 10 mm to 300 mm parallel to the flow direction of the production material vapor. In particular, in combination with the stated grain size distribution, a sufficient cleaning effect at a high throughput can thereby be ensured.

According to the present invention, the reactive trace impurities under B) and C) (for example, silanols, Lewis acids and Lewis bases) are reduced in the purification step of process step (b). A reduction of these trace impurities is, in particular, the reduction to a content of trace impurities which is less than the corresponding content of the commercial production material.

In particular, a production material vapor which has a reproducibly constant composition can be provided with the cleaning step (b) according to the invention. As a result, batch fluctuations in the liquid production material have no influence on the quality of the resulting synthetic quartz glass.

Without wishing to be bound by any particular theory, it also appears to be advantageous that the particle density of the production material in the steam is less than that in liquid extraction (as, for example, in the prior art). This reduces the likelihood of a possible interaction between the silica material and the production material so that undesirable side reactions occur less frequently. At the same time, however, the interaction is sufficient to achieve an effective purification of the production material vapor.

In particular, the process according to the present invention takes place without an upstream liquid phase-solid extraction (HPLC process step).

The purification provided in process step (b) is designed as "in-situ" gas phase-solid extraction. This means that, in the method according to the present invention, the production liquid is not purified as described, for example, in WO 98/47946 A, but rather the vapor of the production material. Upon transfer into the vapor phase, thermal energy is supplied to the raw material. As a result, the chemical composition in the vapor can differ from the original composition (compared to WO 98/47946 A in the liquid phase), since perhaps particularly reactive impurities react at least partially during evaporation or in the vapor phase.

Process Step (c)—Conversion of the Production Material Vapor

In the process step (c), the purified production material vapor, resulting from process step (b), is led to a reaction zone in which the production material vapor is converted to SiO$_2$ particles by oxidation and/or by hydrolysis.

This process step corresponds, in particular, to a known soot process or a known direct vitrification method. The possible embodiments are known to a person skilled in the art.

Process Step (d)—Depositing the SiO$_2$ Particles

In the process step (d), the SiO$_2$ particles resulting from process step (c) are deposited on a deposition surface. The embodiment of this process step is in the skill and knowledge of the expert.

Process Step (e)—Optionally Drying and Vitrification

In the process step (e), the SiO$_2$ particles resulting from process step (d) are dried and vitrified, if necessary, to form synthetic quartz glass. This process step is necessary, in particular, if the previously performed process steps have been carried out according to a soot process. The embodiment of this process step is in the skill and knowledge of the expert.

Overall, the method according to the present invention is also suitable for the production of synthetic quartz glass by "direct vitrification". In this method, due to the sufficient high temperatures during the deposition of the SiO$_2$ particles on a deposition surface in the process step (d), direct vitrification of the SiO$_2$ particles occurs. Therefore, in case of "direct vitrification", the optional process step (e) is omitted. Furthermore, the method according to the invention is also suitable for the production of quartz glass by the "soot process", in which the temperature during the deposition of the SiO$_2$ particles in process step (d) is so low that a porous SiO$_2$ soot layer is obtained, which is dried and vitrified in the separate process step (e) to give synthetic quartz glass.

The process according to the present invention is suitable for producing synthetic quartz glass, which is carried out as an external or internal deposition method. If the method according to the present invention is carried out as an external deposition method, this is preferably an OVD method (Outside Vapor Phase Deposition), VAD method ((Vapor Phase Axial Deposition) or PECVD method (Plasma Enhanced Chemical Vapor Deposition). If the process according to the present invention is carried out as an internal deposition method, it is preferably an MCVD method (Modified Chemical Vapor Deposition).

Apparatus

In another aspect of the present invention, an apparatus for producing a synthetic quartz glass is provided, which is characterized by the following components:

- at least one evaporator zone 1 for evaporating at least one production material which contains at least one polymerizable polyalkylsiloxane compound to form a production material vapor;
- at least one cleaning device 2 into which the production material vapor, resulting from the at least one evaporator zone 1, is led, and which comprises a bulk of porous silica particles which have a specific surface area of at least 2 m$^2$/g, whereby the specific surface area is being determined by a measurement According to Brunauer, Emmett and Teller (BET-surface area);
- at least one reaction zone 3 into which the purified production material vapor, resulting from the at least one cleaning device 2, is passed, and in which the production material is converted to SiO$_2$ particles by pyrolysis or by hydrolysis; and
- at least one deposition zone 4 with a deposition zone for the SiO$_2$ particles resulting from the reaction zone 3, to form synthetic quartz glass.

The device according to the present invention preferably serves performance of the method according to the invention. Thus, all the above-described preferences, which have three-dimensional physical characteristics, are also preferred for the device according to the present invention.

The device according to the present invention is explained below by way of example with reference to FIG. 1.

The apparatus according to the invention comprises at least one evaporator zone 1. At least one production material containing at least one polymerizable polyalkylsiloxane compound is evaporated in this evaporator zone to form a production material vapor. The production material described above can be used as production material in all individual or combined embodiments.

Thus, the evaporator zone 1 comprises a supply line 5 for the at least one production material. Optionally, the evaporator zone may also comprise a supply line 6 for an inert gas.

Transition of the liquid production material into the gas phase occurs in the evaporation zone 1, forming a production material vapor. Embodiments of such an evaporation zone are known to a person skilled in the art.

The production material vapor is purified in the at least one cleaning device 2, into which the production material vapor resulting from the at least one evaporator zone 1 is led. The cleaning device 2 comprises a bulk of porous silica particles 8, which have a specific surface area of at least 2 m$^2$/g, whereby the specific surface area is being determined by a measurement according to Brunauer, Emmett and Teller (BET-surface area). The porous silica particles can preferably be all individual or combined, already described above, preferred silica particle configurations. Likewise, in particular, process step (b) is carried out with all the preferences in this cleaning device 2.

The cleaning device 2 may further preferably comprise a control device for measuring and/or adjusting the production material vapor velocity. Furthermore, the pressure drop can be measured before and after the cleaning device. It is also possible to draw conclusions about the state of the cleaning device 2 via the data obtained by the control device and, if necessary, to recognize the necessity of an exchange or a cleaning operation.

The cleaning device 2 may further comprise at least one temperature control unit. This is to ensure that the production material vapor is held in the gas phase in the at least one cleaning device 2, at a temperature above 100° C., preferably above 120° C.

Furthermore, the cleaning device 2 can preferably comprise at least one fabric 7. The at least one fabric 7 is arranged in such a way that the production material vapor, which is led from the evaporator zone 1, is passed through the at least one fabric before it comes into contact with the bulk of porous silica particles. This at least one fabric 7 serves in particular for the retention of liquid drops which can be included in the production material vapor. This ensures that the production material vapor (initially) comes into contact with the bulk of porous silica particles essentially in the gaseous phase. This means that the production material vapor which comes into contact with the bulk of porous silica particles contains preferably not less than 97% by weight, preferably not less than 98% by weight, more preferably not less than 99% by weight, particularly preferably not less than 99.9% by weight, of gaseous components.

Preferably, the production material vapor is directed from the evaporator zone 1 in a substantially straight path into the cleaning device 2 (i.e., through the at least one fabric 7 and the bulk of the porous silica particles 8). This means that the production material vapor is preferably subject to a maximum of a change in direction of 35°, preferably of 25°, particularly preferably of 10°. Small changes in direction cannot be completely avoided, especially by gravity. Such a navigation of the steam leads in particular to a compact apparatus construction.

The at least one reaction zone 3 of the device according to the present invention is known to a person skilled in the art. The purified production material vapor resulting from the at least one cleaning device 2 is led therein, and the production material is being converted into SiO$_2$ particles by oxidation and/or by hydrolysis. An embodiment according to the above-described direct vitrifying method or the soot method can be provided here.

The at least one deposition zone 4 with a deposition zone for the SiO$_2$ particles resulting from the reaction zone 3 is also known per se to a person skilled in the art.

In FIG. 1, element 9 represents a fabric which fixes and holds the package.

Use

In a further aspect of the present invention, the use of a bulk of porous silica particles is provided for purifying a production material vapor containing at least one polymerizable polyalkylsiloxane compound, whereby the porous silica particles have a specific surface area of at least 2 m2/g and whereby the specific surface area is determined by a measurement according to Brunauer, Emmett and Teller (BET-surface). In the case of the bulk of porous silica particles, it is possible to use all individual or combined embodiments described above.

Quartz Glass

In a further aspect of the present invention, synthetic quartz glass is provided which is obtainable by the method according to the invention. The quartz glass obtained in this way has a homogeneity and reproducibility which results from the efficient purification of the production material vapor.

Furthermore, the synthetic quartz glass, which results from the soot process, has an axially more homogeneous density distribution after the soot deposition.

EXAMPLES

An evaporator according to FIG. 1 was operated with various silica packages according to Examples 1 to 8. The silica packages each had a bulk height of 50 mm after jiggling. The raw material was preheated to 100° C. under identical conditions and then sprayed, together with a preheated to 150° C. nitrogen as a carrier gas, into an evaporating chamber, which had been heated to 180° C.

Subsequently, the average pressure increase of the system on the steam leading side in the pipe and dosing system up to the burner outlet was ascertained in mbar/kg of evaporated production material. The pressure increase of the system is a measure of deposits of polymer residues in the steam leading pipes, throttles and dosing devices. The smaller the pressure increase of the system per evaporated production material, the lower the maintenance effort and process time loss. At the same time, this has an effect on improved reproducibility of the processes as well as improved product homogeneity (axial homogeneity of the soot body or quartz glass).

| Example | BET [m$^2$/g] | Pressure increase of the system ΔP/kg evaporated OMCTS [mbar/kg] | Process stability/ maintenance effort | Comment |
|---|---|---|---|---|
| 1 | 1.5 | 0.1-0.2 | − | |
| 2 | — | >1 | −− | without silica-bulk; pressure increase too high |
| 3 | 4 | 0.005 | + | |
| 4 | 23 | 0.0007 | ++ | |
| 5 | 96 | <0.0002 | +++ | |
| 6 | 212 | <0.0004 | +++ | |
| 7 | 290 | <0.0002 | +++ | |
| 8 | 430 | <0.0005 | +++ | |
| 9 | 500 | 0.1-0.3 | − | |
| 10 | 700 | 0.2-0.6 | − | |

Explanation of Process Stability/Maintenance Effort:
+++: Evaporator maintenance required within >12 weeks
++: Evaporator maintenance required within 8-12 weeks
+: Evaporator maintenance required within 3-8 weeks
−: Evaporator maintenance required within 1.5-3 weeks
−−: Evaporator maintenance required within <1 week It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. Method for the production of synthetic quartz glass, comprising the following process steps:

(a) evaporating a production material containing at least one polymerizable polyalkylsiloxane compound while forming a production material vapor;

(b) passing the production material vapor resulting from process step (a) through at least one cleaning device to purify the production material vapor;

(c) supplying the purified production material vapor resulting from process step (b) to a reaction zone in which the purified production material vapor is converted to $SiO_2$ particles through oxidation and/or through hydrolysis;

(d) depositing the $SiO_2$ particles resulting from process step (c) on a deposition surface; and (e) drying and vitrifying the deposited $SiO_2$ particles resulting from process step (d) to form synthetic quartz glass, wherein the at least one cleaning device of process step (b) comprises a bulk of porous silica particles which have a specific surface area of 2 to 450 m$^2$/g, the specific surface being determined by a measurement according to Brunauer, Emmett and Teller (BET-surface).

2. Method according to claim 1, wherein the bulk of the porous silica particles has a grain size distribution in which at least 75% by weight of the particles have a diameter of 50 to 4000 μm.

3. Method according to claim 1, wherein the bulk density of the bulk of the porous silica particles is 0.5 to 3 g/cm$^3$.

4. Method according to claim 1, wherein the inflow velocity of the production material vapor in the process step (b) is 0.01 to 2 m/s.

5. Method according to claim 1, wherein the bulk height of the bulk of the porous silica particles is 10 mm to 300 mm parallel to a flow direction of the production material vapor.

6. Method according to claim 1, wherein the liquid production material of the at least one polymerizable polyalkylsiloxane compound is not subjected to solid phase extraction prior to evaporation.

7. Method according to claim 1, wherein the polyalkylsiloxane compound is selected from the group consisting of hexamethylcyclotrisiloxan (D3), octamethylcyclotetrasiloxan (D4), decamethyl-cyclopentasiloxan (D5), dodecamethylcyclohexasiloxan (D6), tetradecamethyl-cycloheptasiloxan (D7), hexadecamethylcyclooctasiloxan (D8), their linear homologues and any mixtures thereof.

8. Method according to claim 1, wherein the production material vapor additionally comprises an inert gas.

9. Method according to claim 1, wherein the pressure drop of the production material vapor by the purification in process step (b) is 2 to 750 mbar.

10. Apparatus for the production of synthetic quartz glass comprising:
- at least one evaporator zone (1) for evaporating at least one production material which contains at least one polymerizable polyalkylsiloxane compound to form a production material vapor;
- at least one cleaning device (2) into which the production material vapor resulting from the at least one evaporator zone (1) is led, the at least one cleaning device (2) comprising a bulk of porous silica particles which have a specific surface area of 2 to 450 $m^2/g$, the specific surface area being determined by a measurement according to Brunauer, Emmett and Teller (BET-surface area);
- at least one reaction zone (3) into which the purified production material vapor resulting from the at least one cleaning device (2) is passed and in which the purified production material is converted to $SiO_2$ particles by pyrolysis or by hydrolysis;
- at least one deposition zone (4) with a deposition zone for the $SiO_2$ particles resulting from the reaction zone (3), and
- a heating device to form synthetic quartz glass.

11. Apparatus according to claim 10, wherein the cleaning device (2) additionally comprises at least one fabric (7).

12. Apparatus according to claim 11, wherein the at least one fabric (7) is arranged in such a way that the production material vapor is passed through the at least one fabric (7) before the production material vapor comes into contact with the bulk of porous silica particles.

13. Method according to claim 1, wherein the bulk of the porous silica particles has a proportion of grain sizes <50 µm of at most 20% by weight.

14. Apparatus according to claim 11, wherein the bulk of the porous silica particles has a proportion of grain sizes <50 µm of at most 20% by weight.

* * * * *